June 21, 1949. J. J. SMIDL Re. 23,127

SLIDE RULE CURSOR

Original Filed Nov. 20, 1944

INVENTOR.
Joseph J. Smidl
BY Buckhorn and Cheatham
Attorneys

Reissued June 21, 1949 Re. 23,127

UNITED STATES PATENT OFFICE 23,127

SLIDE RULE CURSOR

Joseph J. Smidl, Portland, Oreg.

Original No. 2,418,910, dated April 15, 1947, Serial No. 564,196, November 20, 1944. Application for reissue December 30, 1948, Serial No. 70,421

5 Claims. (Cl. 235—64.3)

This invention relates generally to scientific instruments and particularly to an attachment for slide rules.

The main object of this invention is to provide a means for facilitating slide rule computation and to reduce the chance for error in making such computation.

The second object is to free the mind of the slide rule operator of the necessity of carrying any figures in his mind in order to place the decimal point correctly when the answer to a problem has been found on the slide rule.

The third object is to free the mind of the operator from the unnecessary retention of values in order to enable him to concentrate on the actual problem at hand and its solution, thereby permitting faster and surer slide rule computations.

The fourth object is to provide a means for indicating the decimal point place without referring to any notes or remembering anything or without making any mental calculations.

I accomplish these and other objects in the manner set forth in the following specification as illustrated in the accompanying drawing, in which Fig. 1 is a front elevation of the device showing same mounted on a portion of a slide rule;

Similar numerals refer to similar parts throughout the views.

Figure 2:
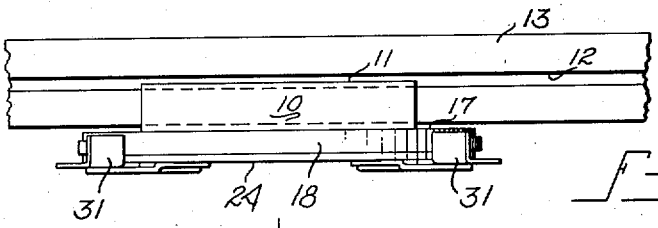
Fig. 2 is a plan of Fig. 1.
Figure 1:
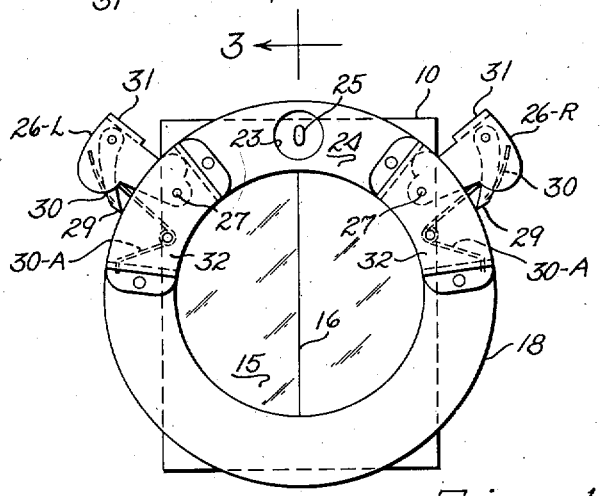
Figure 3:
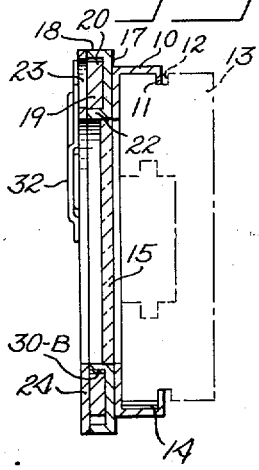
Fig. 3 is a transverse section taken along the line 3—3 in Fig. 1.
Figure 4:
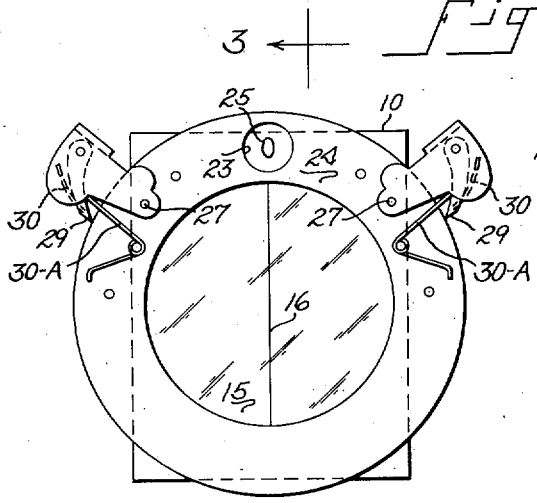
Fig. 4 is a front view with the lever guards removed.
Figure 5:
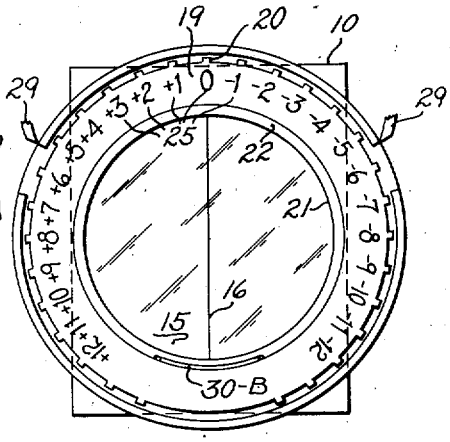
Fig. 5 is a front elevation of the annulus and pawl mechanism, with the parts in front of the same removed for clearness.

Referring in detail to the drawing, there is shown a frame including a runner 10 whose inturned edges 11 engage the grooves 12 in the slide rule 13. A spring 14 affords the desired amount of friction between the runner 10 and the slide rule 13. The transparency 15 is mounted in the sight opening of the runner 10 and has on it an indicator line 16. The device thus far described is now in common use.

Referring particularly to my invention, same will be seen to consist of a hollow ring 17, which is secured to the front of the runner 10, and its inner diameter approximates that of the sight opening of the runner 10. The ring 17 is provided with a rim 18 around the major portion of its circumference. Within the rim 18 is disposed a revolvable annulus 19, which is provided with evenly spaced lugs 20 on its outer circumference. The interior edge 21 of the ring 17 is provided with a rim 22, on which the annulus 19 is capable of rotation. An opening 23 is formed in the cover plate 24, forming part of ring 17, and through this opening can be seen one figure 25, on annulus 19, at one time. These figures may run from zero to plus or minus twelve, in opposite directions, and the figures are spaced corresponding to the spacing of the lugs so that they will appear in opening 23 sequentially at each operation of lever arms 26R and 26L, as will appear.

Portions of the rim 18 are cut away on each side of the opening 23 near the lever arms 26R and 26L, whose pivots 27 are mounted on the cover plate 24. Springs 30A urge the outermost ends of the levers 26R and 26L toward the opening 23.

Each lever arm 26R and 26L is provided with a pawl 29, which is urged by a spring 30 through the adjacent cut-away portion of rim 18 into engagement with the lugs 20 when the lever arm 26R or 26L is moved downwardly. This downward movement is accomplished by the manual operation thereof by means of the operator's finger on the upper side of the slide rule. It will be noted that when the pawls 29 are in retracted positions, they ride upon the outer side of the rim 18 in order to hold the pawls out of engagement with the lugs 20. The portion 31 of each lever 26R and 26L is turned inwardly, as indicated. A spring 30B is interposed between the parts 19 and 22, frictionally to hold the part 19 in position.

In order that the levers 26R and 26L may be shielded, there is provided for each of same the curved guard 32, which permits a limited amount of free movement of the lever arms referred to. The guards 32 are secured to the cover plate 24 in any convenient manner. It is important that the cut away portions of the rim 18 and the travel of the pawl 29 are such that only one characteristic at a time can be made to pass the opening 23 so that careless or fast or slow operation of the lever arms 26R or 26L will always produce but one change in the characteristic value. Preferably, the lugs 20 are omitted from a portion of annulus 19 opposite the zero figure 25 so that the device cannot be made to overrun from positive to minus figures or vice versa.

In order that the purpose of the invention may be understood it will suffice to state that each depression of lever 26R moves the annulus 19 in the direction to bring one of the numerals 25, which has an algebraic value higher than the previously appearing numeral, the amount of increase being the numeral one, into view in the window 23; and each depression of the lever 26L moves the annulus in the opposite direction so that a numeral 25 having a value of one less than the previously appearing numeral will appear in window 23. The operator depresses the proper lever the correct number of times algebraically to add together the characteristics of the numerals being involved in the computation in accordance with known rules for summation of characteristics in slide-rule operations. In utilizing the present invention the operator determines the characteristic of each numeral involved in a computation being performed on the slide rule in accordance with the rules of the system he is using and algebraically adds the characteristics together by depressing the proper operating lever or levers the correct number of times. The device therefore serves as a visual reminder of the characteristic of the result of any operation performed on the slide rule.

It can be seen from the foregoing that if the operator wished a plus 4 characteristic, he would simply operate the plunger 26R until he brought the value plus 4 into the opening 23. He would then proceed with his computation and at the time of pointing off his result, he would merely need to glance at the value in the window or opening 23 in order to determine the location of the decimal point.

I am aware that numerous forms of counters and indicators have been constructed in the past. I therefore do not cover such devices broadly, but I do intend to cover all such forms and modifications thereof as fall fairly within the appended claims.

I claim:

1. A cursor for slide rules comprising a frame adapted to be mounted slidably on a rule, said frame including a hollow ring, an annulus revolvably mounted in said ring, said frame having an opening therein through which a portion of said annulus may be observed, said annulus having lugs formed thereon, a pair of lever arms hinged to said frame, each of said lever arms having a pawl mounted thereon, one of said pawls engaging said lugs to drive same in a clockwise direction and the other pawl engaging said lugs to drive same in a counterclockwise direction, one lug at a time, said annulus being provided with characteristics thereon ranging through sequentially arranged positive values in one direction and negative values in the other direction.

2. A cursor for slide rules comprising a frame, a rotatable annulus mounted within said frame, said annulus having characteristics indicated thereon, said characteristics being sequentially arranged in a series of ascending positive values around one side and a series of ascending negative values around the other side, said annulus having lugs formed thereon, a lever arm mounted at each side of said frame, each of said lever arms having a pawl thereon, said frame being cut away to permit said pawls to engage said lugs and impart movement thereto through one unit of space between characteristics on said annulus, said frame having an opening therein through which one of said characteristics may be viewed.

3. A cursor for slide rules comprising a frame adapted to be slidably mounted on a slide rule, said frame including a hollow ring so arranged as to permit viewing of the slide rule indicia within the confines of the ring, an annulus revolvably mounted in said ring, said annulus having evenly spaced lugs thereon and having numerals thereon spaced according to the spacing of said lugs, said numerals ranging sequentially through a series of plus and minus values in opposite directions around the annulus, said ring having an opening therein through which one of said numerals may be viewed at a time, a pair of manually engageable lever arms hinged to said frame, each of said lever arms having a pawl mounted thereon, spring means urging said pawls to engage said lugs, one of said pawls engaging said lugs to drive said annulus in a clockwise direction and the other of said pawls engaging said lugs to drive said annulus in a counterclockwise direction, other spring means for returning said levers to their starting positions, means on said frame to hold said pawls from engagement with said lugs when said levers are at their starting positions, and means to limit movement of each of said levers to the amount required to withdraw one numeral from said opening and place an adjacent numeral within said opening at each movement thereof.

4. A cursor for slide rules comprising a frame adapted to be slidably mounted on a slide rule, said frame including a hollow ring so arranged as to permit viewing of the slide rule indicia within the confines of the ring, an annulus revolvably mounted in said ring, said annulus having evenly spaced lugs thereon and having numerals thereon spaced according to the spacing of said lugs, said numerals ranging sequentially through a series of plus and minus values in opposite directions around the annulus, said ring having an opening therein through which one of said numerals may be viewed at a time, a pair of manually engageable lever arms hinged to said frame, each of said lever arms having a pawl mounted thereon, spring means urging said pawls to engage said lugs, one of said pawls engaging said lugs to drive said annulus in a clockwise direction and the other of said pawls engaging said lugs to drive said annulus in a counterclockwise direction, other spring means for returning said levers to their starting positions, means on said frame to hold said pawls from engagement with said lugs when said levers are at their starting positions, means to limit movement of each of said levers to the amount required to withdraw one numeral from said opening and place an adjacent numeral within said opening at each movement thereof, and means to limit rotation of said annulus in either direction of movement so that the portion thereof opposite the portion having the zero numeral thereon may not rotate past said opening.

5. A cursor for slide rules comprising a frame adapted to be slidably mounted on a slide rule, said frame including a hollow ring so arranged as to permit viewing of the slide rule indicia within the confines of the ring, an annulus revolvably mounted in said ring, said annulus having evenly spaced lugs thereon and having numerals thereon spaced according to the spacing of said lugs, said numerals ranging sequentially through a series of plus and minus values in opposite directions around the annulus, said ring having an opening therein through which one of said numerals may be viewed at a time, a pair of manually engageable lever arms hinged to said frame, each of said lever arms having a pawl mounted thereon, spring means urging said pawls to engage said lugs, one of said pawls engaging said lugs to drive said annulus in a clockwise direction and the other of said pawls engaging said lugs to drive said annulus in a counterclockwise direction, other spring means for returning said levers to their starting positions, means on said frame to hold said pawls from engagement with said lugs when said levers are at their starting positions, means to limit movement of each of said levers to the amount required to withdraw one numeral from said opening and place an adjacent numeral within said opening at each movement thereof, and means frictionally resisting rotation of said annulus.

JOSEPH J. SMIDL.

No references cited.